(12) United States Patent
Johnsen et al.

(10) Patent No.: US 8,122,301 B2
(45) Date of Patent: Feb. 21, 2012

(54) PERFORMING REMOTE LOADS AND STORES OVER NETWORKS

(75) Inventors: Bjørn Dag Johnsen, Oslo (NO); Rabin A. Sugumar, Sunnyvale, CA (US); Ola Torudbakken, Oslo (NO)

(73) Assignee: Oracle America, Inc., Redwood City, CA (US)

( * ) Notice: Subject to any disclaimer, the term of this patent is extended or adjusted under 35 U.S.C. 154(b) by 304 days.

(21) Appl. No.: 12/495,400

(22) Filed: Jun. 30, 2009

(65) Prior Publication Data

US 2010/0332908 A1     Dec. 30, 2010

(51) Int. Cl.
*G06F 11/00* (2006.01)
(52) U.S. Cl. ........................................................ 714/56
(58) Field of Classification Search .................... 714/4.1, 714/4.11, 5.11, 18, 31, 39, 43, 45, 47.1, 56
See application file for complete search history.

(56) References Cited

U.S. PATENT DOCUMENTS

| | | | |
|---|---|---|---|
| 5,448,698 A | 9/1995 | Wilkes | |
| 6,125,399 A * | 9/2000 | Hamilton | 709/245 |
| 6,704,831 B1 * | 3/2004 | Avery | 710/310 |
| 6,917,987 B2 * | 7/2005 | Parthasarathy et al. | 709/249 |
| 7,496,095 B1 | 2/2009 | Davis | |
| 7,502,826 B2 * | 3/2009 | Barron et al. | 709/205 |
| 2003/0023666 A1 | 1/2003 | Conway et al. | |
| 2004/0193734 A1 * | 9/2004 | Barron et al. | 709/250 |
| 2007/0041383 A1 * | 2/2007 | Banikazemi et al. | 370/395.3 |
| 2008/0127203 A1 * | 5/2008 | Huang et al. | 719/313 |
| 2010/0332676 A1 * | 12/2010 | Sugumar et al. | 709/232 |

OTHER PUBLICATIONS

International Search Report and Written Opinion for Application No. PCT/US2010/026911, mailed Aug. 20, 2010; 15 pages.
Office Action for U.S. Appl. No. 12/402,804, mailed Sep. 20, 2010; 16 pages.
"InfiniBand Architecture Specification vol. 1, Release 1.2.1"; InfiniBand Trade Assocation; Nov. 2007; 1727 pages.
Michael L. Scott; "Shared Memory Models"; Workshop on Communication and Middleware for Parallel Programming Models; Apr. 2002; 29 pages.
Leonidas Kontothanassis, Robert Stets, Galen Hunt, Umit Rencuzogullari, Gautam Altekar, Sandhya Dwarkadas, and Michael L. Scott; "Shared Memory Computing on Clusters with Symmetric Multiprocessors and System Area Networks", ACM Transactions on Computer Systems, vol. 23, Issue 3, Aug. 2005; 33 pages.
Yong Xiong, Jyh-Charn Liu, and Wei Zhao; "On the Smoothing of Traffic Flows Using ON-OFF Control"; Real-Time Systems Symposium, Work-in-Progress Session, Dec. 3, 2003; 3 pages.
Fabrizio Petrini, Wu-Chun Feng, Adolfy Hoisie, Salvador Coll, and Eitan Frachtenberg; "The Quadrics Network: High-Performance Clustering Technology"; Los Alamos National Laboratory; IEEE Micro 22(1) Jan.-Feb. 2002; pp. 46-57.

* cited by examiner

*Primary Examiner* — Nadeem Iqbal
(74) *Attorney, Agent, or Firm* — Meyertons Hood Kivlin Kowert & Goetzel, P.C.; Jeffrey C. Hood

(57) ABSTRACT

A network adaptor which performs CPU loads and stores to remote memory over network fabrics. The network adaptor receives a transfer request from a compute node and converts the request to a remote transfer request, which is transmitted to the network. The network adaptor then monitors the network connection for a remote completion response. When the network adaptor receives the remote completion response within a specific time period, the network adaptor transmits a first completion response to the compute node. If the network adaptor does not receive the remote completion response within the specific time period, the network adaptor transmits an "early completion response" to the compute node. The network adaptor continues to monitor for the actual response. This allows the compute node to continue processing without having to wait for the actual response to be received. The method handles small payloads efficiently and also accounts for long completion delays.

20 Claims, 10 Drawing Sheets

PERFORMING REMOTE LOADS AND STORES OVER NETWORKS

FIELD OF THE INVENTION

The present disclosure relates generally to clusters, and more particularly to an improved method for performing CPU loads and stores to remote memory over network fabrics.

DESCRIPTION OF THE RELATED ART

A cluster generally refers to a group of computers that have been linked or interconnected to operate closely together, such that in many respects they form a single computer. Large clusters can comprise thousands of individual computer systems that have been linked together. The components (e.g., individual computers or "compute nodes") of a cluster are often connected to each other through local area networks via network adapters. Clusters generally provide greatly improved performance and/or availability over that provided by a single computer. A cluster is also typically more cost-effective than a single computer of comparable speed or availability.

A cluster generally comprises a plurality of compute nodes (e.g., servers) and the "interconnect" between these compute nodes. An important aspect to building large cluster systems is the interconnect. The interconnect may comprise a "fabric", e.g., the network that connects all of the servers together, as well as host adaptors that interface each of the computer systems (servers) to the fabric. One commonly used cluster interconnect is Ethernet. More recently, clusters have started using Infiniband as the interconnect. InfiniBand is a switched fabric communications link primarily used in high-performance computing and provides quality of service and failover features as well as scalability. An Infiniband interconnect generally provides lower latency, higher bandwidth, and improved reliability.

Many organizations such as research centers and national laboratories require large clusters with thousands of nodes to satisfy their compute requirements. It is very important to reduce the overhead of communication in such large clusters to allow applications to scale efficiently.

Compute nodes in a cluster may use various mechanisms for communication with other compute nodes in the cluster. For example, compute nodes may use a protocol referred to as Message Passing Interface (MPI) for data communication. Compute nodes may also use Remote Direct Memory Access (RDMA). Further, compute nodes may use CPU loads and stores to perform data communication.

RDMA allows data to be moved directly from the memory of one computer to the memory of another computer without involving either computer's operating system. This permits high-throughput, low latency networking.

CPU load and store transfers involve the CPU directly performing the data transfer operation itself.

Normally when a process or thread executing on a compute node wishes to initiate a RDMA network request, the process writes a request in a hardware defined format to a hardware recognized address or location in the network adapter of the compute node or in memory of the compute node. The network adapter will then process the request. On a RDMA write, the network adapter may read the buffer from system memory, package the data into one or more packets, and send the packets over the network. On a RDMA read, the network adapter may send a request packet over the network to the remote node, and when the remote node responds with payload packets, the data is deposited in the buffer specified in the RDMA read request.

RDMA reads and writes are in many cases a more efficient mechanism to transfer data than sending and receiving messages using CPU loads and stores. However, RDMA reads and writes are less efficient than CPU loads and stores when moving small payloads (less than or equal to 8 B, say) in the following respects:

1. A series of stores from the CPU is used to provide sufficient information to the network adapter to allow a request command to be created.

2. When data is typically read from host or system memory (on a RDMA write) or written to system memory (on a RDMA read). The CPU either loads data from or stores data to system memory depending on the RDMA transfer direction. There is hence, an additional level of indirection.

3. The CPU checks for completion of the request as a separate operation that may involve interrupts and loads and stores to manage completion structures.

By supporting accesses to remote memory through normal CPU loads and stores for moving small payloads, significant CPU efficiency gains may be realized.

One problem when using CPU loads and stores to access remote memory relates to how to handle cases where the load or store cannot complete for long periods owing to network congestion or failure. Note that within a single server loads and stores are designed to complete within a more or less fixed time period regardless of congestion, and failures in the intra-server network are not tolerated. Such constraints are not practical in requests that travel over a network fabric such as Infiniband. This invention also describes a solution to the problem of handling long delays on remote load and store requests.

SUMMARY OF THE INVENTION

Embodiments of the invention relate to a system and method for performing CPU loads and stores to remote memory over network fabrics. Embodiments of the invention may handle small payloads efficiently and may also account for long completion delays. Embodiments of the invention may provide improved cluster performance or improved performance of a server within a cluster or improved performance of an application running on a server within a cluster. The cluster may comprise a plurality of compute nodes (e.g., servers) connected by a fabric. Each of the compute nodes may comprise a host CPU and a host memory. The fabric may comprise a fabric switch which interconnects the compute nodes, e.g., using Infiniband. The fabric may also couple the compute nodes to storage devices or to external networks, such as the Internet. The compute nodes may communicate with each other using a Message Passing Interface (MPI) protocol.

Each compute node may couple to a compute node interface device (also referred to herein as a network adaptor) for interfacing between the compute node and the fabric. The network adaptor is thus configured to interface between the compute node and other compute nodes in the cluster.

The method may be performed by a network adaptor, wherein the network adaptor is coupled to a first compute node in the cluster. According to one embodiment of the method, the network adaptor may receive a local data transfer request over a local communications bus from the first compute node. The network adaptor may then convert the local data transfer request to a remote data transfer request and transmit the remote data transfer request to the network through a network connection. The network adaptor may then monitor the network connection for a remote completion response corresponding to the remote data transfer request. When the network adaptor receives the remote completion response within the specific time period, the network adaptor may generate and transmit over the local communications bus to the first compute node a first local completion response. The first local completion response may be based on the remote completion response and correspond to the local data transfer request. If the network adaptor does not receive the remote completion response within the specific time period, the network adaptor may generate and transmit over the local communications bus to the first compute node a second local completion response ("early completion response") corresponding to the local data transfer request. The first and second local completion responses each indicate that the local data transfer request has been completed.

Thus, when an actual (successful) response has not been received by the network adaptor within the specific time period, the network adaptor provides a completion response (an "early completion response") to the first compute node. In the case of a read, the early completion response may contain some predetermined data. The predetermined data may be signature data, which may indicate to the compute node software that this completion response was an early completion. In the case of an early completion, the remote data transfer request (which was generated from the local data transfer request) in fact has not actually completed. In one embodiment, if the predetermined data is not signature data, this indicates that the completion is not an early completion.

Meanwhile, the network adaptor continues to monitor for the actual response. This allows the first compute node to continue processing without having to wait for the actual response to be received. When the actual response is later received after the specific time period (and after the "early completion response" has already been provided), the network adaptor performs the appropriate action, e.g., generates and transmits first response information corresponding to the remote completion response to a data structure in memory. For example, on a read operation, the first response information is configured to replace at least a portion of data received during the second local completion response. Thus the "early completion response" can be viewed as a type of "fake" response, and when the "real" or actual response is received later, the network adapter takes the appropriate action, e.g., depending on whether the request was a read or write.

The network adaptor may instead receive a remote error response corresponding to the remote data transfer request, wherein the remote error response indicates that the remote data transfer has been terminated unsuccessfully. In the case of receipt of a remote error response, the network adaptor may generate the second local completion response (the "early completion response") in response to receiving the remote error response.

Therefore, when the local data transfer request is a load request, the load data comprises either 1) first data received over the network connection as part of the remote completion response, when the remote completion response is received within the specified time period; or 2) second data of predetermined value, when the remote completion response is not received within the specified time period or when an error response is received.

In converting the local data transfer request to a remote data transfer request, the network adaptor may be configured to compare a portion of an address field of a local transfer request to one or more specified values, select a set of data items based on the comparison, and generate the remote data transfer request based on one or more of the set of data items.

When the compute node receives the load data, the compute node determines whether the load data comprises the predetermined value. If the compute node determines that the load data does not comprise the predetermined value, the compute node confirms that the load data comprises the first data. If the compute node determines that the load data does comprise the predetermined value, the compute node determines if the response was an early completion response (which is the most likely case) or if the remote node happened to return the predetermined value as the data (which is less likely).

The network adaptor may comprise a host interface configured to communicate with a local host system, a network interface configured to communicate with a network, and transfer management circuitry coupled to the host interface and the network interface. During operation the transfer management circuitry is configured to perform the operations set out above. In one embodiment, the network adaptor comprises a memory which stores a tracking structure comprising one or more records. The network adaptor uses the tracking structure to manage the operations described above. Each record may comprise one or more of: a first entry indicating a source of a respective local data transfer request of the local data transfer requests; a second entry identifying the respective local data transfer request; and/or a third entry indicating when a respective specific time period has expired. The network adapter may be configured to interface the local host system to a plurality of other host systems in a cluster computing system.

BRIEF DESCRIPTION OF THE DRAWINGS

A better understanding of embodiments of the present invention can be obtained when the following detailed description of the preferred embodiment is considered in conjunction with the following drawings, in which.

DEFINITIONS

Figure 1:
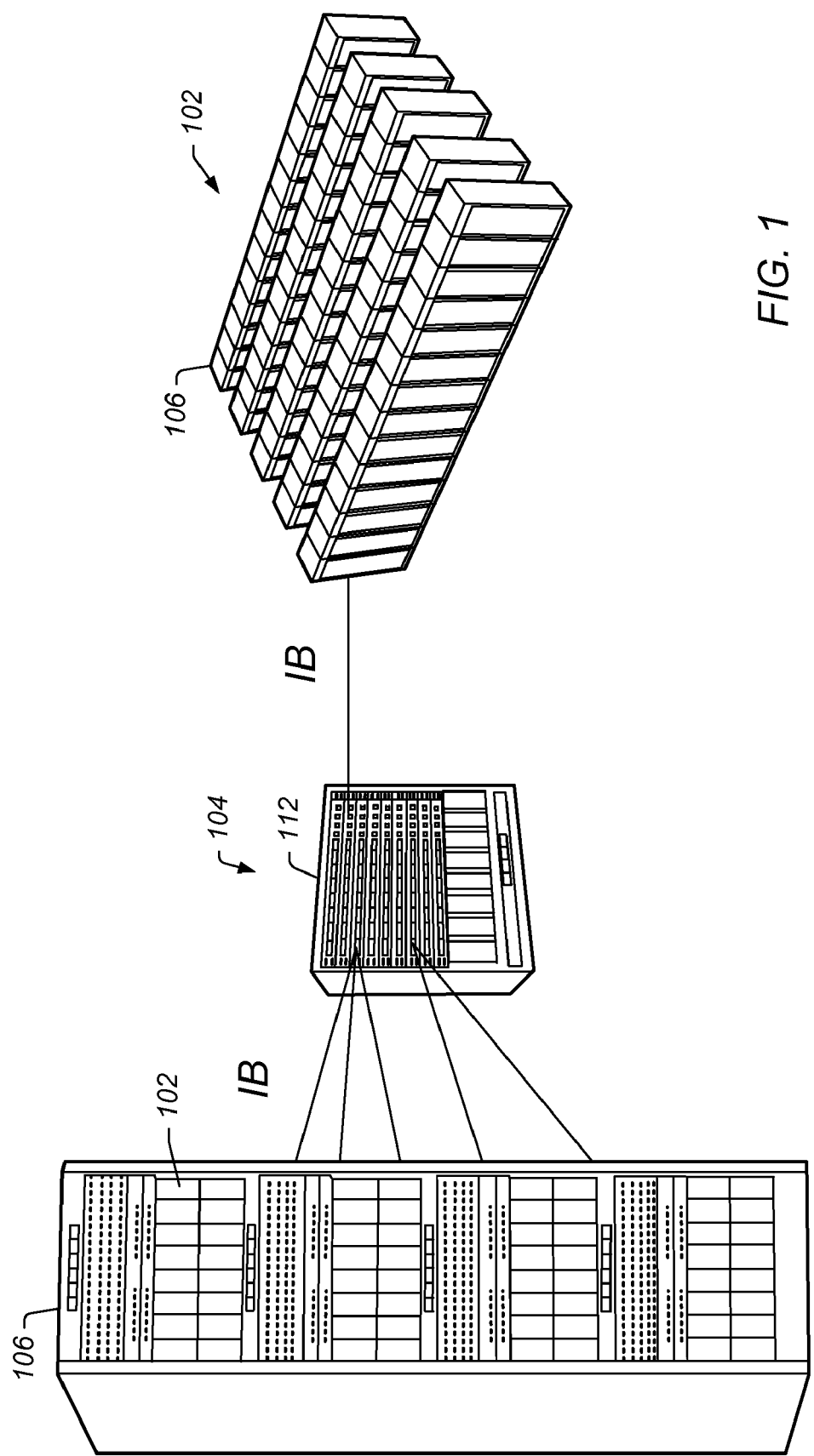
FIG. 1 illustrates an exemplary cluster according to one embodiment of the invention.

Compute node—refers to a computer system having a processor (or CPU) and memory. A Compute node may have a single processor (which may be single core or multi-core) or may have a plurality of processors. One example of a Compute node is a blade server.

Local node—refers to the compute node corresponding to a local reference. For example, the compute node associated with a particular CPU would be the CPU's local node.

Network Fabric—refers to a network or interconnect for connecting multiple compute nodes Compute Node Interface Device (or "Network Adaptor")—refers to an interface for coupling a Compute Node to a Network (or Network Fabric)

Remote Location—refers to a location on another machine on a network

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1 illustrates an exemplary cluster system according to one embodiment of the invention. As shown, the system may comprise a plurality of computer systems or compute nodes 102 that are connected together by an interconnect 104. The compute nodes 102 may take various forms. In the embodiment of FIG. 1, the compute nodes 102 comprise blade servers that are housed in one or more racks 106. The interconnect 104 may comprise a fabric switch 112 as shown. The interconnect 104 may support only a single protocol, or may support a plurality of protocols. In the exemplary embodiment shown, the interconnect 104 may support the Infiniband (IB) protocol.

On the left side of exemplary FIG. 1, the cluster comprises one or more racks 106 each comprising 4 blade server chassis' which each comprise a plurality of blade servers (compute nodes) 102. The blade servers 102 on the left connect to the fabric switch 112 through Infiniband. In one embodiment, the blade servers 102 connect to the fabric switch 112 over Infiniband in all cases. As shown on the right side of FIG. 1, the fabric switch 112 may couple to additional racks 106 having additional compute nodes 102.

Each of the compute nodes 102 may couple to (or comprise) a compute node interface device, also referred to herein as a "Network Adaptor" or Scalable Interface (SIF), (110 FIG. 2) which provides an interface for the respective compute nodes 102. The compute node interface device or SIF 110 couples to a respective compute node 102 and provides an IB interface for the compute node 102 to the fabric 104, e.g., to the fabric switch 112. The compute node interface device 110 is mostly referred to herein as a "Network Adaptor" for the sake of convenience.

Figure 2:
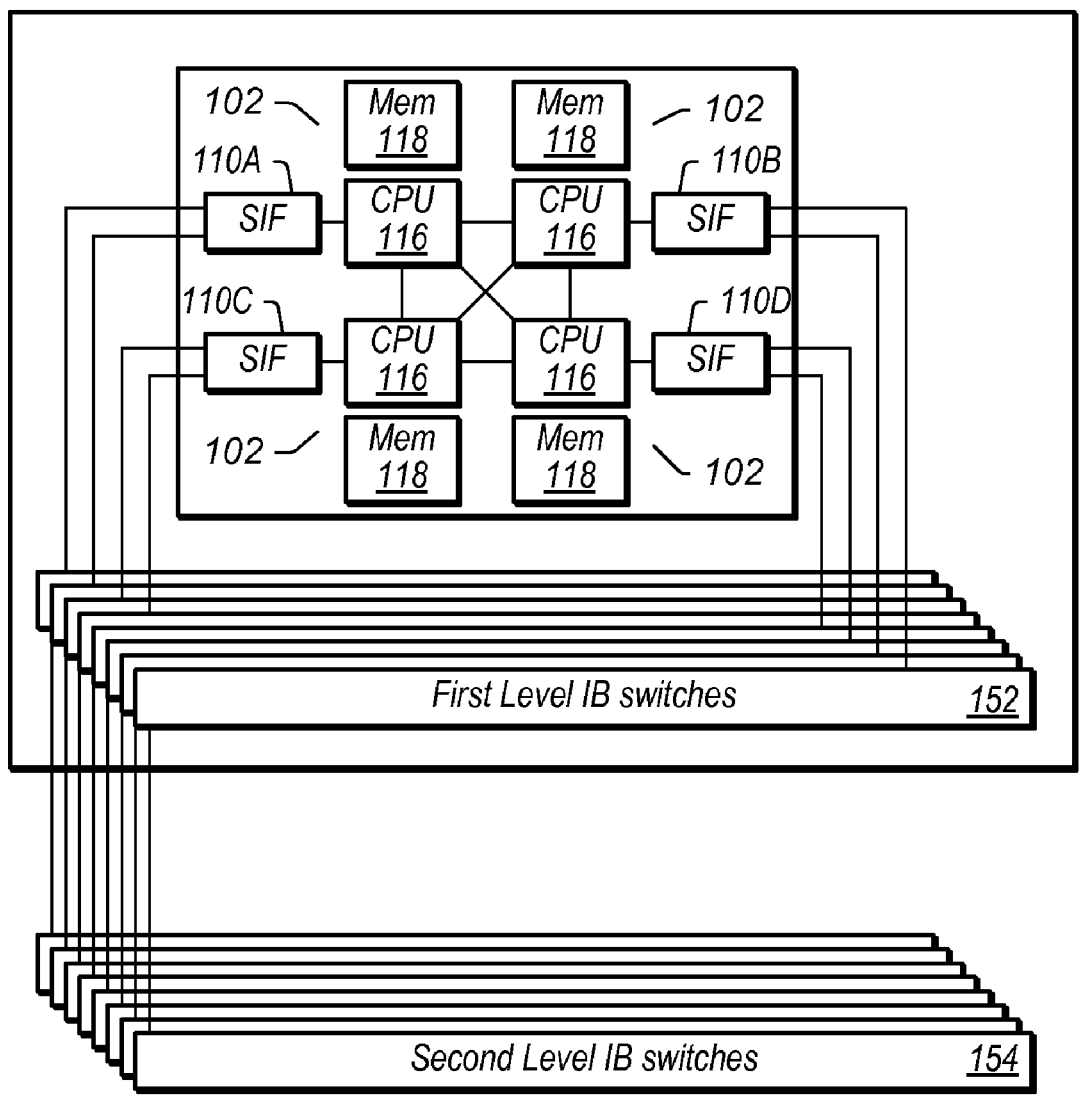
FIG. 2 is a block diagram of a portion of the cluster of FIG. 1, showing an exemplary compute node (4 server blade) connected to several levels of switches.

FIG. 2 is a block diagram illustrating a portion of a cluster system comprising an exemplary server blade (compute node 102) connected to form the cluster. Each compute node 102 comprises a corresponding Scalable Interface (SIF) block (compute node interface device) 110 (labeled as 110A-110D). Each CPU (or compute node) 102 couples to its respective Scalable Interface (SIF) 110A-D also located on the blade server. The SIF blocks 110 (110A-110D) each provide an Infiniband interface to a respective compute node 102. The SIF blocks 110 (110A-110D) each comprise a host interface for coupling to the host bus or processor bus of its respective compute node 102, as well as an Infiniband interface. The SIF block 110 is discussed in more detail with respect to FIG. 3.

Each of the SIF blocks 110 (110A-110D) may couple to Infiniband switches 152, referred to in FIG. 2 as First Level IB switches 152. The First Level IB switches 152 in turn may couple to Second Level IB switches 154, as shown. The First Level IB switches 152 may couple to the Second Level IB switches 154 through cables, as shown. There may be additional levels of IB switches.

Figure 3:
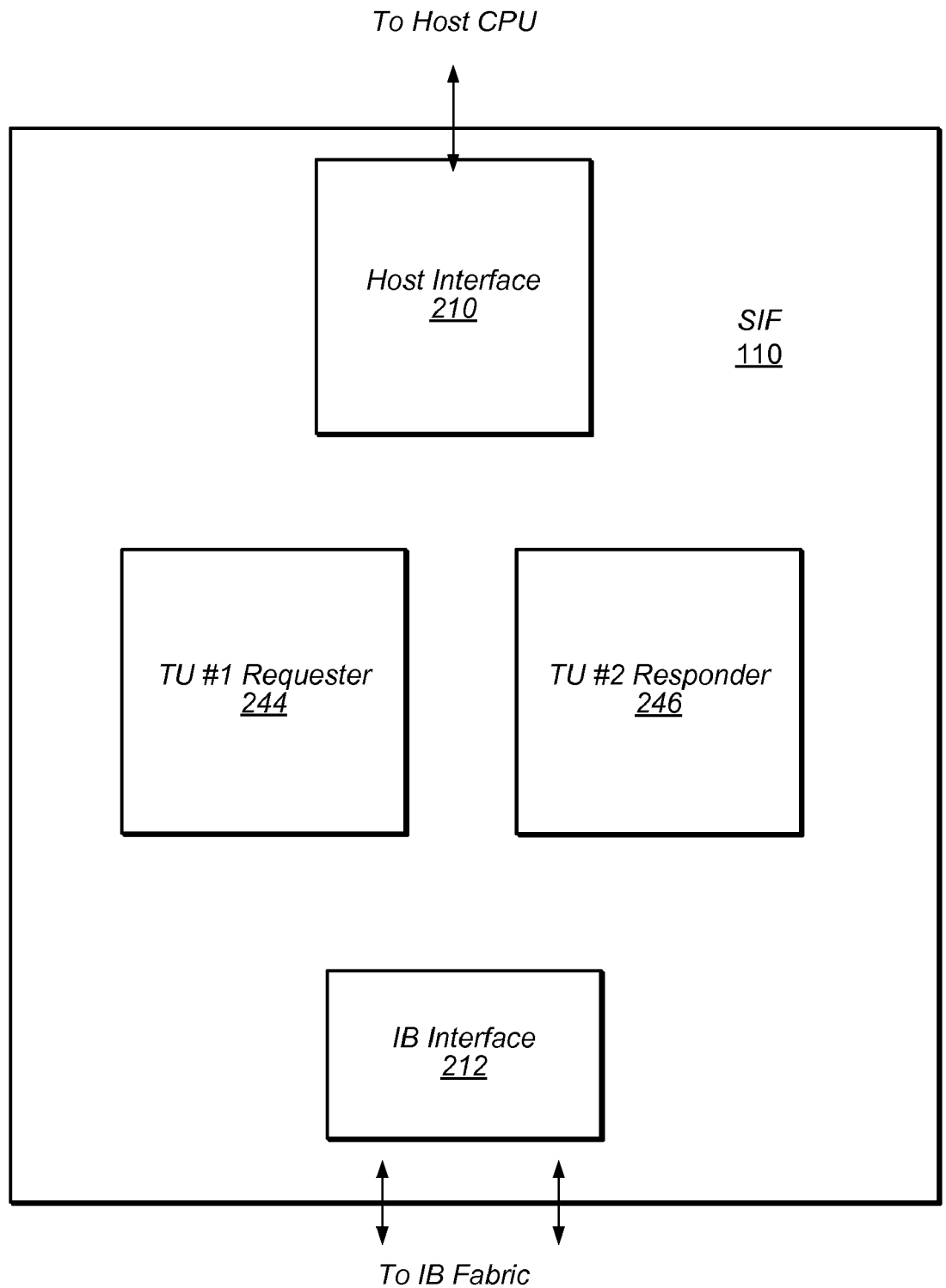
FIG. 3 is a block diagram of an exemplary scalable interface (SIF) used in interconnecting the various compute nodes in the cluster of FIG. 1.

FIG. 3 is a block diagram of an exemplary Scalable Interface (SIF) block (compute node interface device) 110. The SIF network adapter 110 operates as an interface or I/O adapter for each compute node 102 in the cluster. In one embodiment, the SIF 110 does not include a general purpose CPU and does not execute an operating system, and hence is a hardware-centric structure. The SIF 110 provides various services in hardware that would normally require software execution.

As shown, the SIF block 110 includes a host bus interface 210 for coupling to a computer system, e.g., in blade server 102. The SIF block 110 also includes a network fabric interface such as Infiniband interface 212, for coupling to Infiniband, e.g., for coupling to the network fabric 104.

The exemplary SIF block 110 comprises a TU#1 (Transaction Unit) Requestor block 244 and TU#2 Responder block 246. The TU#1 Requestor block 244 generates/processes requests that are provided to other computer systems. The TU#2 Responder block 246 is responsible for responding to incoming packets, e.g., incoming send requests from other compute nodes 102. The TU#1 Requestor block 244 and the TU#2 Responder block 246 may each couple to the host bus interface 210 and the IB interface 212.

TU#1 244 is the Requester TU. All requests sent by SIF 110 go through one of the TUs. SIF 110 supports the Infiniband (IB) reliable communication protocol, whereby in one implementation every request is properly acknowledged by the receiver before the request is completed at the sender. SIF 110 supports multiple command registers for applications to deposit commands—each command register typically dedicated to a host process running on a core. As the deposited commands are kicked off with doorbells, the commands merge into a stream of commands that then feeds into the TU scheduler which schedules them onto available threads/command-slots on the 64 thread engine. A doorbell is a write issued by software running on a CPU to an address mapped to a device (such as a network adapter) which causes the device to perform some action (such as sending a packet over the network fabric). Thus a doorbell is analogous to a house doorbell in the sense that it tells the device that some new action is needed.

TU#2 246 is the Responder TU. All incoming requests are directed to the Responder TU (TU#2) 246 which processes the packet, ultimately delivering the packet to off-chip or on-chip memory or to other logic for processing collectives. The Responder TU (TU#2) 246 accesses a header matching block comprising a large header store that can hold many thousands of headers, a buffer to hold a send request payload when a matching receive is not immediately found, and one or more matcher units to perform multiple searches, e.g., in parallel. When a successful match is found, the incoming payload is directly copied into the receive buffer in memory.

The SIF 110 may comprise transfer management circuitry which manages transfers as described herein. The transfer management circuitry is coupled to the host interface 210 and the network interface 212. The transfer management circuitry may be comprised in one or more of the host interface 210, the TU#1 244 and/or the TU#2 246.

Figure 4:
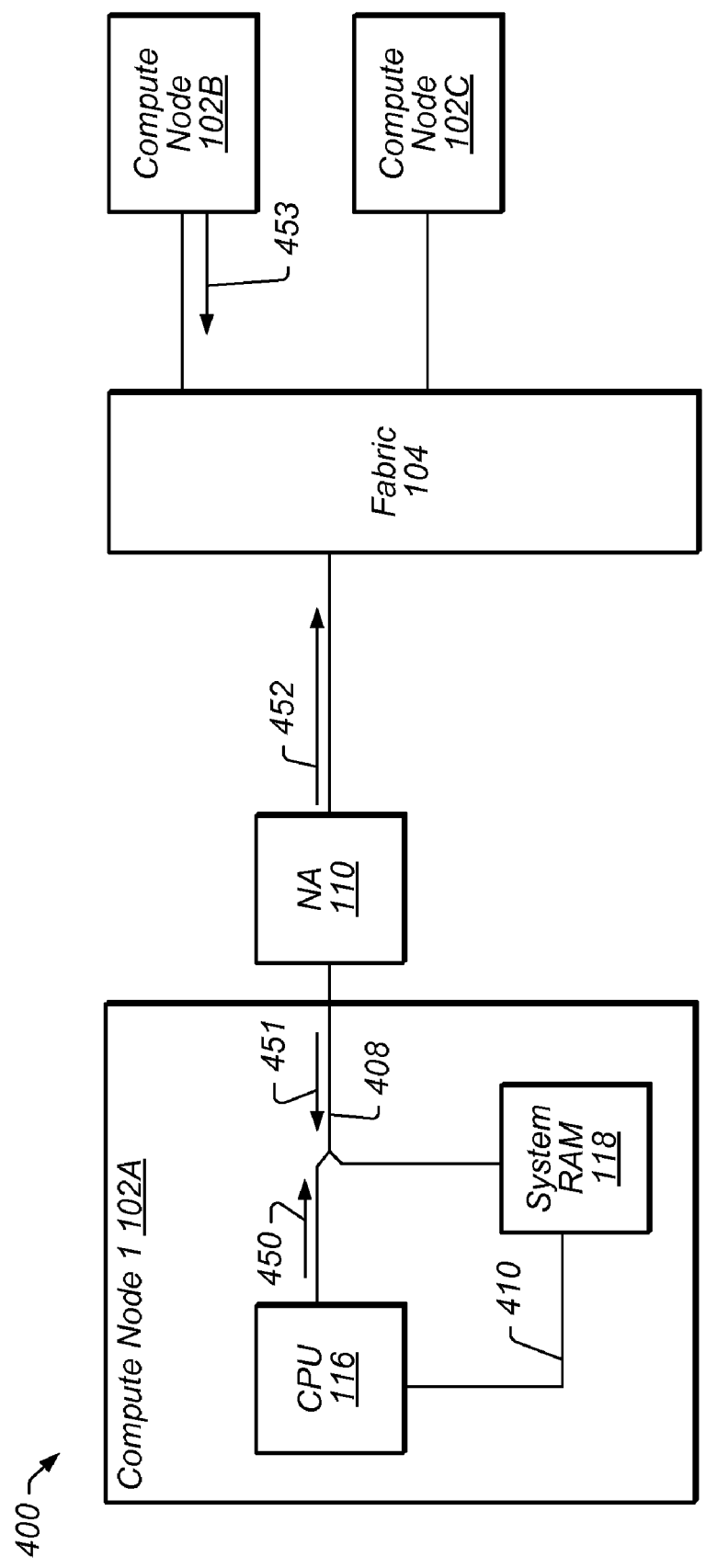
FIG. 4 illustrates a exemplary network of compute nodes, in which the invention resides, according to one embodiment the invention.
Figure 8:
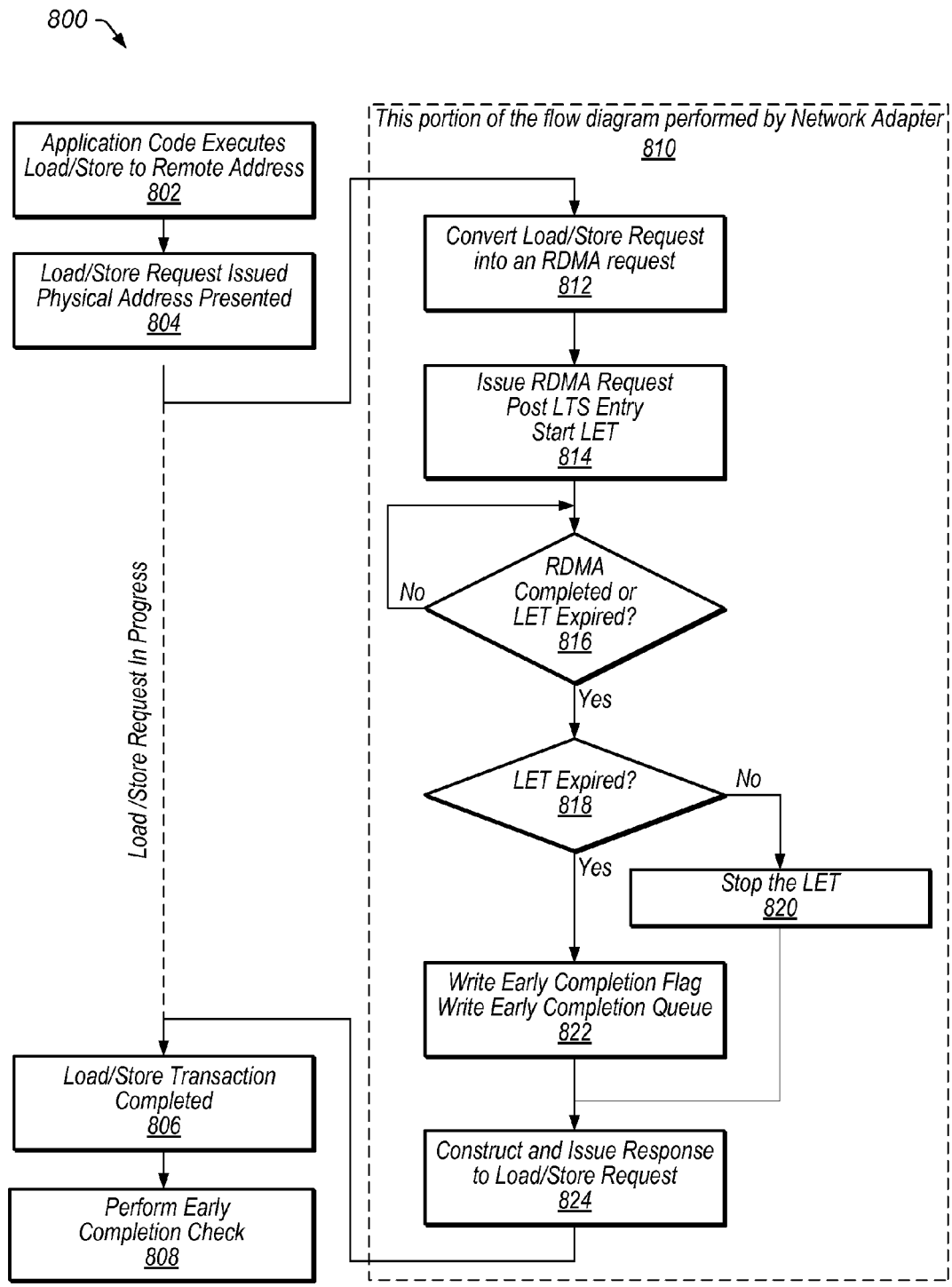
FIG. 8 illustrates an exemplary process flow for the execution of remote load/store operations using an embodiment of the invention

FIG. 4 shows a system that includes an embodiment of the invention. The system comprises a networked computer system 400 with three compute nodes that are connected to each other via a network fabric 104. FIG. 4 also illustrates a flow of operations that are performed according to one embodiment of the invention. FIG. 8 provides a more detailed discussion of the operations shown in FIG. 4.

Compute node 102A (first compute node) is shown in expanded detail and is, from an explanatory perspective, considered to be the local node. Consequently, 102B and 102C are considered, from an explanatory perspective, to be remote nodes. Compute nodes 102B and 102C may be the same as, or significantly different from, compute node 102A, but they are able to communicate with each other via the network fabric 104. Compute node 102A in FIG. 4 is similar to compute node 102 in FIGS. 1 and 2, except in this exemplary embodiment compute node 102A is shown as having one processor. Compute nodes 102B and 102C will have respective compute node interface devices (or SIFs) coupled between them and the fabric 104. However, these SIFS are not shown in FIG. 4 for the sake of clarity.

The compute node 102A comprises a Central Processing Unit (CPU) 116 coupled to a system memory 118 via bus 410. A compute node interface device 110, referred to here as network adapter (NA) 110, is shown coupled to the compute node 102A via a local communications bus 408. The communications bus 408 allows the CPU 116 and the NA 110 to communicate and it also allows the NA 110 to access System RAM 118. The NA 110 is in one embodiment a computer hardware component that is designed to allow computers to communicate over a computer network. The NA 110 may be implemented on a dedicated card or integrated onto a CPU motherboard. The NA 110 is shown as a device separate from the compute node 102A. However, in another embodiment, the NA 110 is integrated with or on the compute node 102A. The NA 110 may include a controller, memory and other circuitry in addition to control software. Data may be sent from one computer on the network to another by "writing" the data to the NA 110. The NA 110 may then perform various steps to enable the correct transmission of the data across a network to a remote machine.

In response to the CPU 116 executing certain instructions, a load/store request may be made to a remote node. The term "load/store request" refers to either a request for a data load operation or a request for a data store operation. For ease of reading, the terminology "load/store request" is used to refer to a request that may be a load request or may be a store request. The term "load/store" may be similarly applied to a CPU instruction, a transaction or a bus transaction. Similarly "read/write transaction" is used to refer to either a data read transaction (where data is retrieved) or a data write transaction (where data is sent). A read/write transaction may be performed in response to a load/store request. In one embodiment the requesting device may be a CPU and a load request may arise from the execution of an instruction that involves a data value being read into the CPU. Any instruction that causes such a data retrieval, whether explicitly stated or not, may be considered a "load instruction". A load request coupled with a corresponding request response may be considered to form a load transaction. A load transaction may commonly take the form of a bus read transaction (data is retrieved) on a communications bus (e.g. processor bus). In this case, it is expected that a completed bus read transaction will constitute a completed load request.

Similarly, in one embodiment the requesting device may be a CPU and a store request may arise from the execution of an instruction that involves a data value to be written out of the CPU. Any instruction that causes such a data transmittal, whether explicitly stated or not, may be considered a "store instruction". A store request coupled with a corresponding request response may be considered to form a store transaction. A store transaction make commonly take the form of a bus write transaction (data is sent) on a communications bus (e.g. processor bus). In this case, it is expected that a completed bus write transaction will constitute a completed store request.

The NA 110 is configured to recognize load/store requests (local data transfer requests) 450 targeted at remote nodes 102B, 102C and also to automatically convert each such load/store request 450 on the local node's communications bus 408 into a load/store RDMA request (remote data transfer request) 452 that is sent over the network fabric 104 to an appropriate remote node (e.g. 102B). The remote node 102B targeted by the RDMA request 452, attempts to handle the request and send a timely RDMA response 453 to the NA 110 of the requesting node 102A. In general, however, a timely RDMA request response 453 cannot be relied upon for a variety of reasons.

An embodiment of the network adapter 110 may comprise timer circuitry that is used to generate an event if a RDMA request-to-response delay (the delay in receiving a remote completion response) exceeds the interval of an associated NA 110 timer. These events trigger the NA 110 to generate a response 451 to the remote load/store request 450 associated with the RDMA request. In this case, the response 451 generated by the NA 110 provides an "early completion" (EC) (first local completion) response to the associated load/store request. An EC response may also be generated if the NA 110 receives, in responses to a remote load/store request 450, a remote response 453 that indicates the remote transaction could not be completed successfully (in this case the EC response may be referred to as a third local completion response).

In contrast, if the RDMA response 453 is received before an associated timer expires; the RDMA response 453 triggers the NA 110 to generate a remote load/store response 451 that provides a "normal completion" (second local completion) response. Note that in one embodiment the CPU 116 does not distinguish between an early completion and a normal completion based on the response 451.

Figure 9:
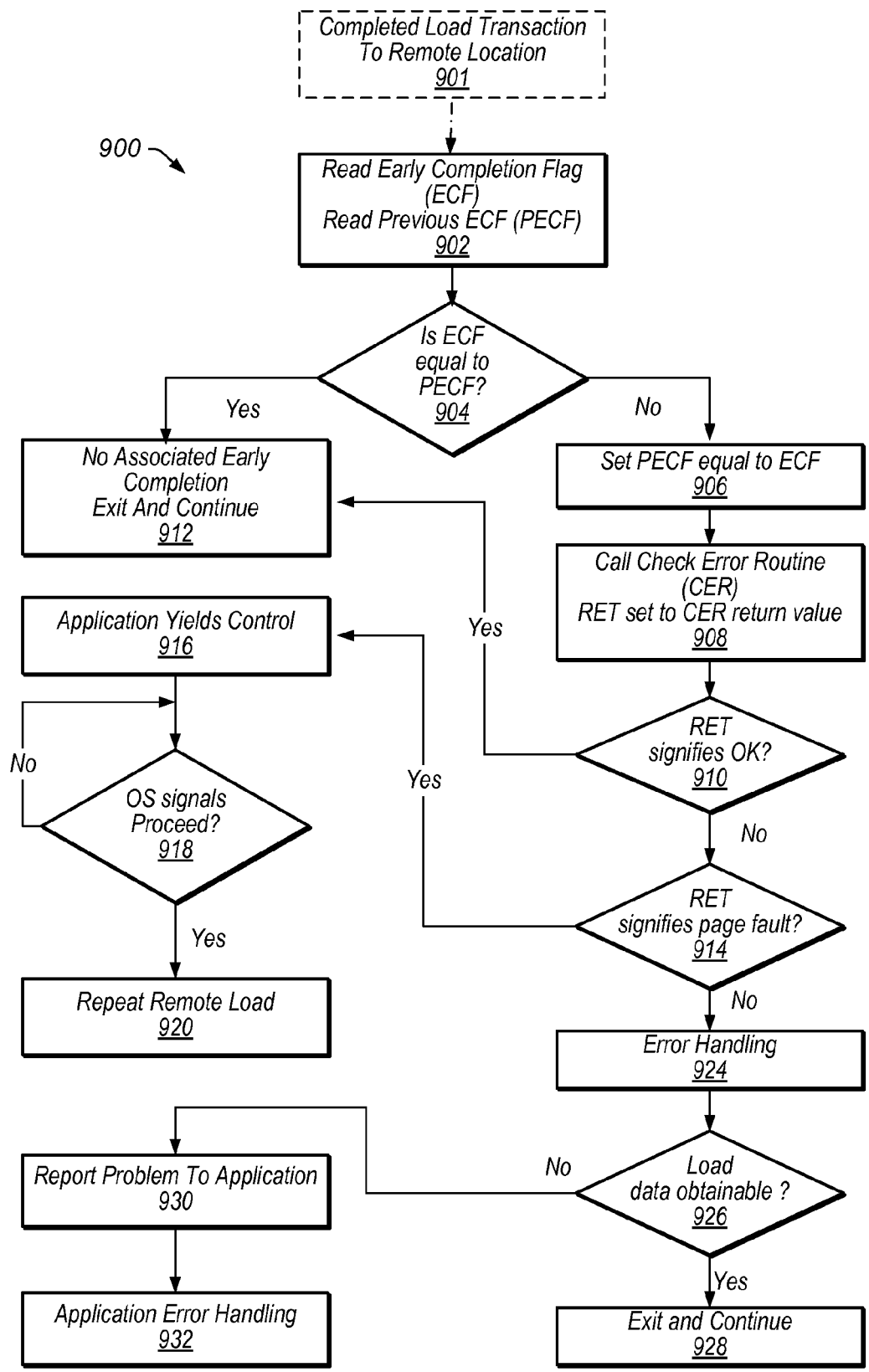
FIG. 9 illustrates an exemplary procedure used for checking completion status following the execution of a load instruction to a remote location.

Before a remote load/store transaction can be relied upon, additional checks are performed to determine if the completion was an early completion or a normal completion. If the transaction was completed early, additional steps may be taken to avoid ensuing problems. If a remote load access is completed early, the NA 110 may provide alternative load data as part of an early completion response. If this alternative load data is assumed by the application to be the data received from a remote node, then erroneous behavior may result. Additionally, this alternative load data may set to a specified value (or "signature") (first data of a pre-determined value) in order to distinguish loads that did not encounter an EC. Problems may also arise if a remote store transaction has an early completion and remedial action is not taken. The process of checking for early completions and performing remedial actions is illustrated in FIG. 9 for load transactions and FIG. 10 for store transactions.

From a higher, system level perspective the process for dealing with early completions may involve a combination of hardware and software components. These components may include software procedures running on CPU 116, calls to the operating system of compute node 102A and the use of data items and data structures such as:—an early completion identifier (second information) in the form of a sequence number, an early completion queue (a first set of records), an early completion record (a first record) and an early completion flag (information held in a first memory location). Through these and other measures, the remote load/store transactions may be, if feasible, effectively completed.

Network Adapter

Figure 5:
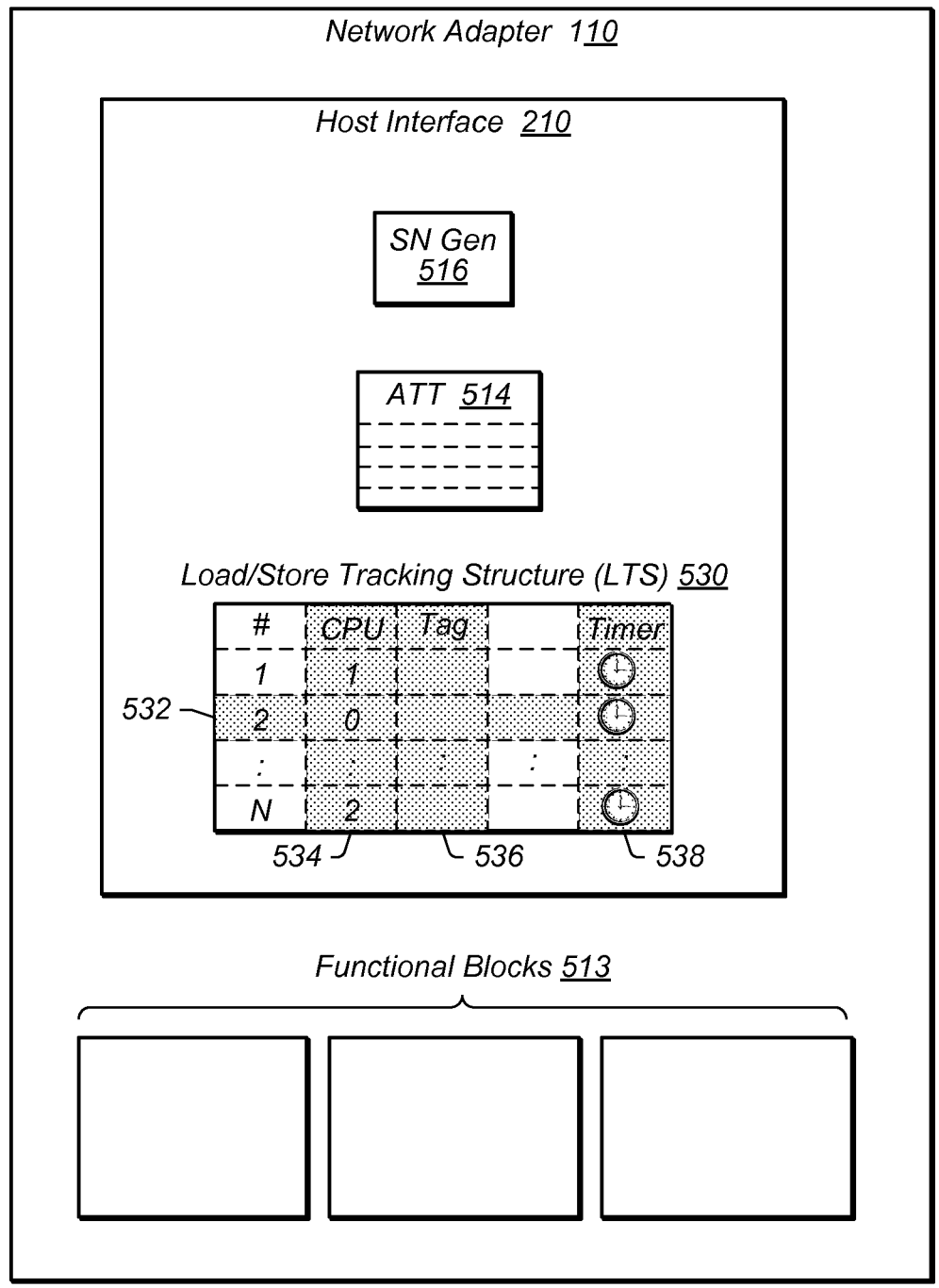
FIG. 5 is a representation of an exemplary network adapter (NA) according to one embodiment of the invention, in which hardware elements are shown.

FIG. 5 shows an embodiment of NA 110 that supports an improved method for performing remote loads/store transactions. The NA 110 comprises a host interface 210 and functional blocks 513. Functional blocks 513 may comprise, for example a transaction unit responder, a transaction unit requestor and an IB interface. Other NA 110 embodiments may have more or less blocks inside 513 than the three represented in FIG. 5. Essentially, functional blocks 513 represents the all functions—other than a host interface—that may be present in an NA embodiment. In this embodiment, the Host Interface 210 comprises an address translation table (ATT) 514, a sequence number generator 516 and a load/store tracking structure (LTS) 530. In other embodiments, one or more of the components 514, 516 and 530 may be implemented elsewhere within the NA 110 (e.g. within functional blocks 513) or elsewhere within compute node 102A.

Each load/store request (to a remote location) that is serviced by network adapter 110 may have an associated record (LTS row 532) created in an LTS 530. In some embodiments, this tracking structure may form part of the electronics of network adapter 110. An LTS record 532 may be used to manage information relevant to a load/store request and also an associated RDMA request. Each LTS record 532 may include a data field (LTS column 534) that identifies a device (e.g. CPU) associated with the load/store request. Each record 532 may also include an identifying tag (LTS Column 536) for a load/store request that may be used by a device (e.g. CPU) to associate returned values with a load request that issued it, or the store that is waiting for completion. Importantly, each record may also include a timer (LTS column 538) for managing delays. Depending on the requirements of the local bus protocol, the tracking structure may additionally hold other data.

The sequence number (SN) generator 516 (SN Gen) may be used to create identifiers for the purpose of tracking completions. The SN generator 516 may be implemented in various ways. In some embodiments a simple counter may be employed.

The ATT 514 is used to support the translation of a physical address associated with a CPU load/store request into various parameters that may be used to perform an associated RDMA operation. The ATT 514 may be configured by the operating system or other privileged software running on the compute node. Various embodiments of an ATT 514 are possible. For example, the ATT 514 could be constructed using a mixture of RAM, registers and combinational logic. Regardless of the embodiment, ATT 514 enables the translation of a load/store request into parameters used for a corresponding RDMA request.

Figure 6:
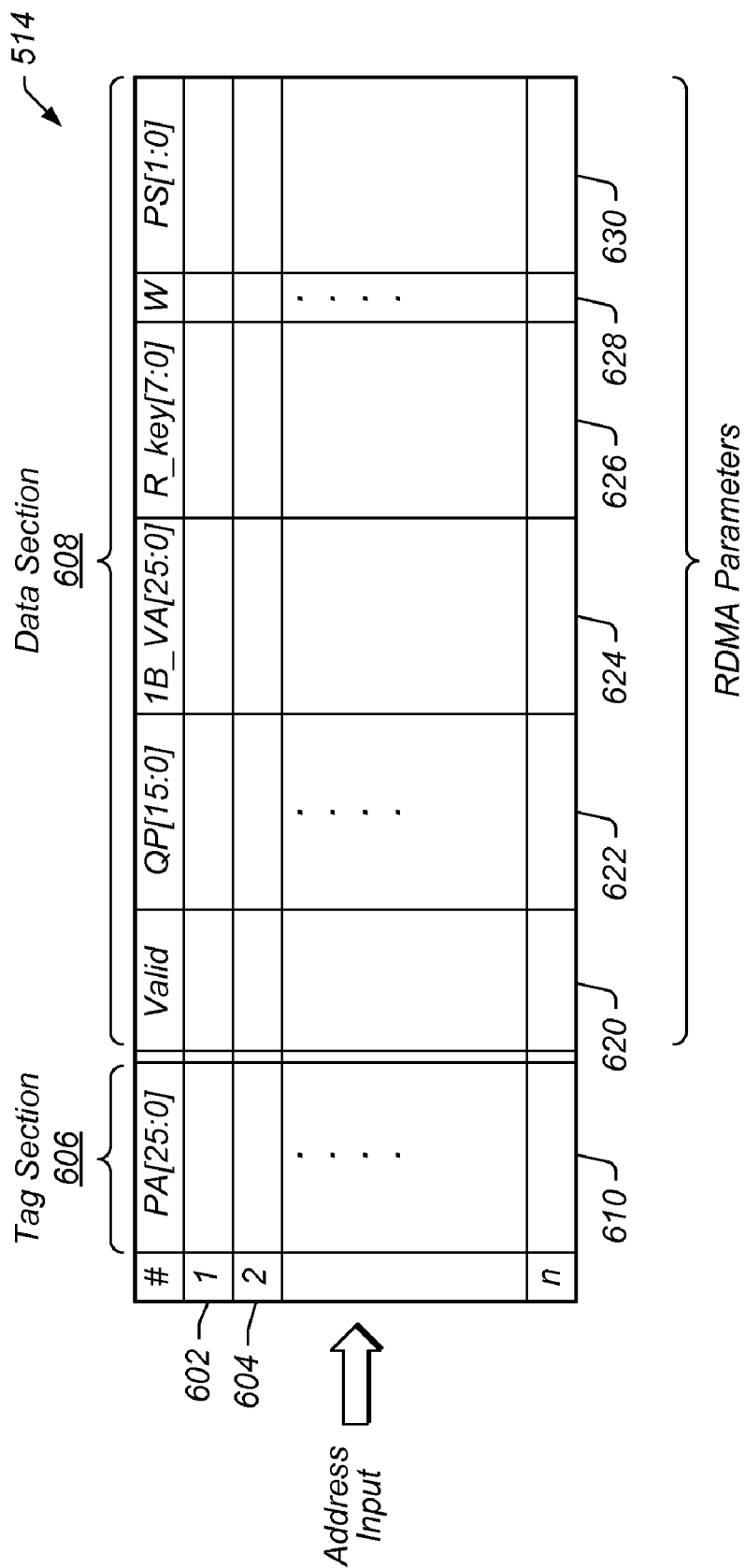
FIG. 6 is a representation of an exemplary network adapter (NA) according to one embodiment of the invention, in which functional elements are shown.

FIG. 6 shows an embodiment of an ATT 514 that may be employed for a compute node 102 connected to an Infiniband fabric 104. The ATT 514 is comprised a tag section 606 and a data section 608, and the ATT 514 is structured so that each table entry is comprised of a tag portion and a data portion. The ATT 514 entries are shown as horizontal rows (e.g. 602, 604).

The tag section 606 of the ATT 514 (e.g. 602, 604), comprises a single column 610. This column 610 holds 26-bit "PA[25:0]" data values that corresponds to a portion of an input address. If a pre-defined portion of an input address presented to NA 110 on communications bus 408 matches one of the PA[25:0] values held in the tag section 606, then data portion corresponding to the matched tag may be utilized for address translation.

The data section 608 of the ATT 514 may be further sub-divided into individual data items. This sub-division is shown as columns 620, 622, 624, 628 and 630. Column 620 holds values for a "Valid" bit. Each Valid bit indicates if the corresponding ATT entry is valid. Column 622 holds 16-bit "QP [15:0]" data values. Each QP[15:0] segment provides an identifying value for a queue pair representing a connection. Column 624 holds "IB_VA[25:0]" data values, each of which corresponds to a portion of an address on a remote node. Column 626 holds 8-bit "R-key[7:0]" values, each of which are used to validate an RDMA operation on a remote node. Column 628 holds "W" bit values, each of which indicates if a remote location is writable. Finally, Column 630 holds "PS[1:0]" data values. Each PS[1:0] value is a 2-bit code word representing a page size on the remote node, where 00 indicates 4 kB, 01 indicates 2 MB and 10 indicates 1 GB.

System RAM

Figure 7:
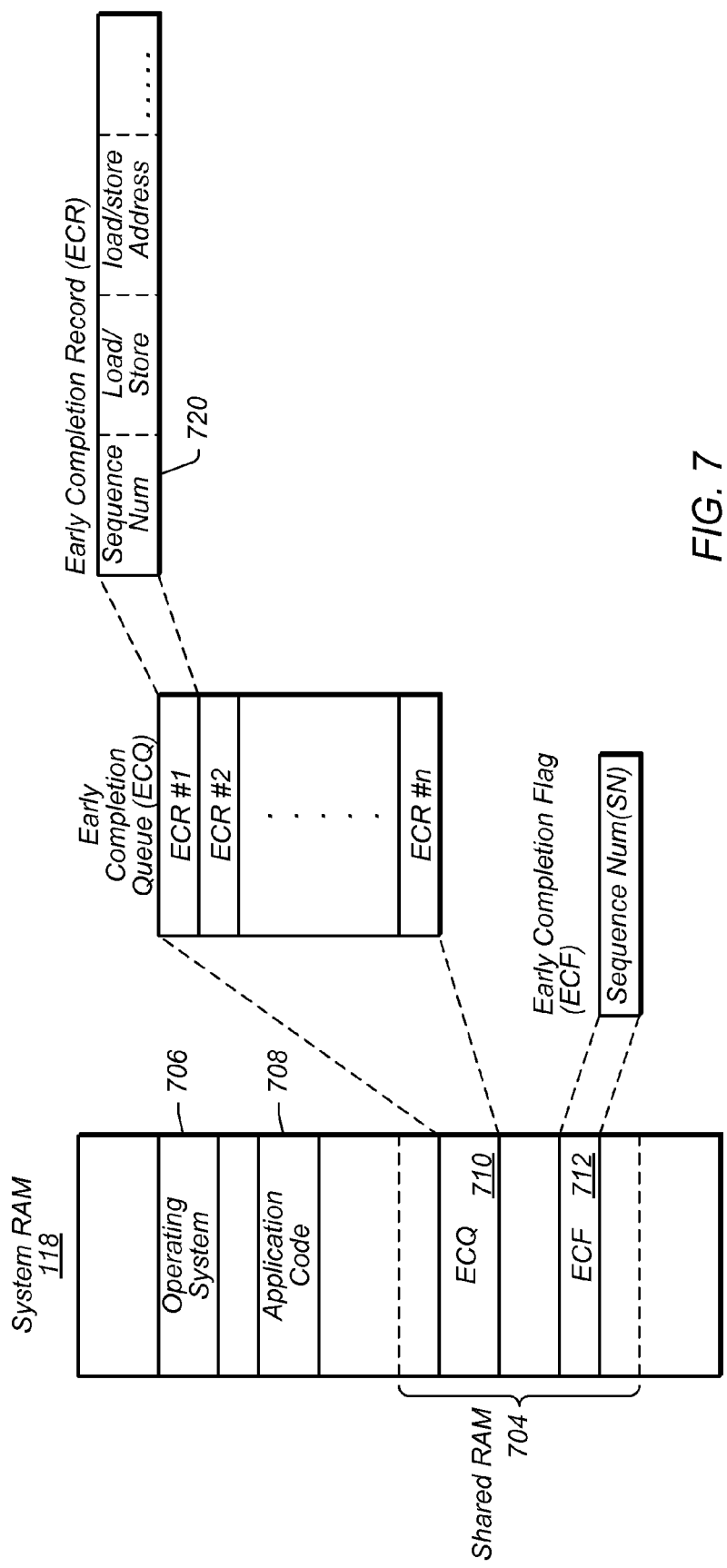
FIG. 7 is a representation of an exemplary system memory according to one embodiment of the invention, in which functional elements are shown.

FIG. 7 shows an embodiment of System RAM 118 that supports an improved method for performing remote loads/store transactions as described herein. A portion of the system RAM 118 may be considered shared RAM 704. Locations in shared RAM 704 can be accessed by multiple devices (i.e. CPU 116 and NA 110). The System RAM 118 contains at least a portion of the operating system 706 (and other privileged software) that runs on the compute node 102A. The OS 706 may function to initialize an ATT 514 and provide system services.

The system RAM 118 also includes application code 708 that runs on the compute node 102A and includes instructions that invoke remote load/store requests. The application code also includes software routines that check for early completions and perform remedial actions when an EC is detected.

The shared RAM 704 portion of system RAM 118 includes data structures that support an improved method for performing remote loads/store transactions. Among these structures are an Early Completion Queue (ECQ) 710 and an Early Completion Flag (ECF) 712.

When a remote load or store request is completed early, a data record, known as an Early Completion Record (ECR) 720 is created and placed in a data structure known as an ECQ 710. The ECR 720 holds data associated with an individual EC. For example, an ECR 720 may hold the following items—an SN, a transaction type identifier (i.e. load or store), and a target address of a load/store request. Software may search the ECQ 710 to look for an ECR 720 corresponding to a given load/store request. If such an ECR 720 is not found, the system may determine that the given load/store request was not subject to an EC. The number of ECRs 720 held in the ECQ 710 may be significant. The management of the ECQ 710 may be performed by privileged software, such as the OS 706.

Whenever a load/store request results in an EC response, an identifier associated with that EC is written to an assigned location. The data held in that location is called the Early Completion Flag (ECF). The embodiment shown in FIG. 7, the ECF is located in a portion of system RAM 118 designated shared RAM 704. Also, in this embodiment, the identifier written to the ECF is the SN associated with the EC. In alternative embodiments, the ECF may located in the NA and another identifier may be used.

Remote Load/Store Transaction Flow

FIG. 8 shows a flow that an embodiment may utilize to process a load/store request directed to a remote location. The flow diagram 800 is arranged in two columns emphasizing the different roles played by a local CPU 116 and local network adapter NA 110. On the left hand side the actions may be primarily associated with the local CPU 116. On the right hand side the actions may be primarily associated with the local NA 110.

The process 800 may be initiated by the CPU's execution of a load/store instruction held in application code at 802. The execution of the instruction causes a load/store request to be issued on the CPU's bus interface 804. If the data address referenced by the load/store instruction corresponds to a location on a remote node, then the CPU 116 issues a load/store request 804 wherein a physical address is presented that corresponds to the data address of the instruction.

In 812, a previously configured NA 110 recognizes the physical address presented as corresponding to a remote location. As the flow moves from the CPU 116 (804) to the NA 110 (812), note that the CPU's load/store request remains outstanding.

In 812, the NA 110 uses the presented physical address, together with the various data held in ATT 514, to construct either an RDMA read request (for a CPU load request) or an RDMA write request (for a CPU store request).

In 814, the NA 110 issues the recently constructed RDMA read/write request over the network fabric. The NA 110 places an entry in an LTS that corresponds to the load/store request and starts a timer associated with the LTS entry. To clarify, each RDMA read/write request has a corresponding LTS entry and a corresponding LTS entry timer (LET). Each LET is configured so that its timeout period is less than any of the following, a CPU timeout period, a bus transaction timeout period and an operating system timeout period.

In general, when a load/store instruction (or an associated bus read/write transaction) does not complete within some upper limit time period, it may cause problems at the CPU 116 (since CPUs and operating systems are not normally designed for unbounded delays). The problems may be manifested as a "time out" at the CPU 116 which may be a fatal error in many systems and may cause the local node to come down. Alternatively, the problems may take the form of an operating system timeout, which may also result in the entire local node coming down. Node failure on a delayed network response is undesirable, and node failures caused by RDMA response delays are prevented in this embodiment.

Once the RDMA request is issued, the NA 110 waits at 816 for completion of the RDMA request and the expiration of the associated LET. If either event occurs, the method at 818 determines if the LET has expired. If the LET did not expire, then the LET is halted at 820. If the LET did expire, the NA 110 writes the sequence number corresponding to the early completion to the early completion flag, and deposits an early completion record in the early completion queue at 822.

Completion of 820 and 822 leads to 824, where a completion response to the CPU's load/store request is constructed and issued. If the LET has expired, it is most likely the associated RDMA request has not completed, and so the completion response given can be considered "early". If a CPU load request was issued, then valid data are normally expected as part of a completion response. However, if an associated LET had expired, then the NA supplies the CPU with "dummy" data as part of its early completion response. Once this response is received by the CPU, the load/store transaction that was started by the issuing of a request in 804 has been completed 806.

A final step in this flow is to determine the EC status associated with the load/store transaction 808 and then to take, if necessary, appropriate remedial steps. The steps in performing 808 are described in detail in FIG. 9 for load requests and FIG. 10 for store requests.

Early Completion Checking

Figure 10:
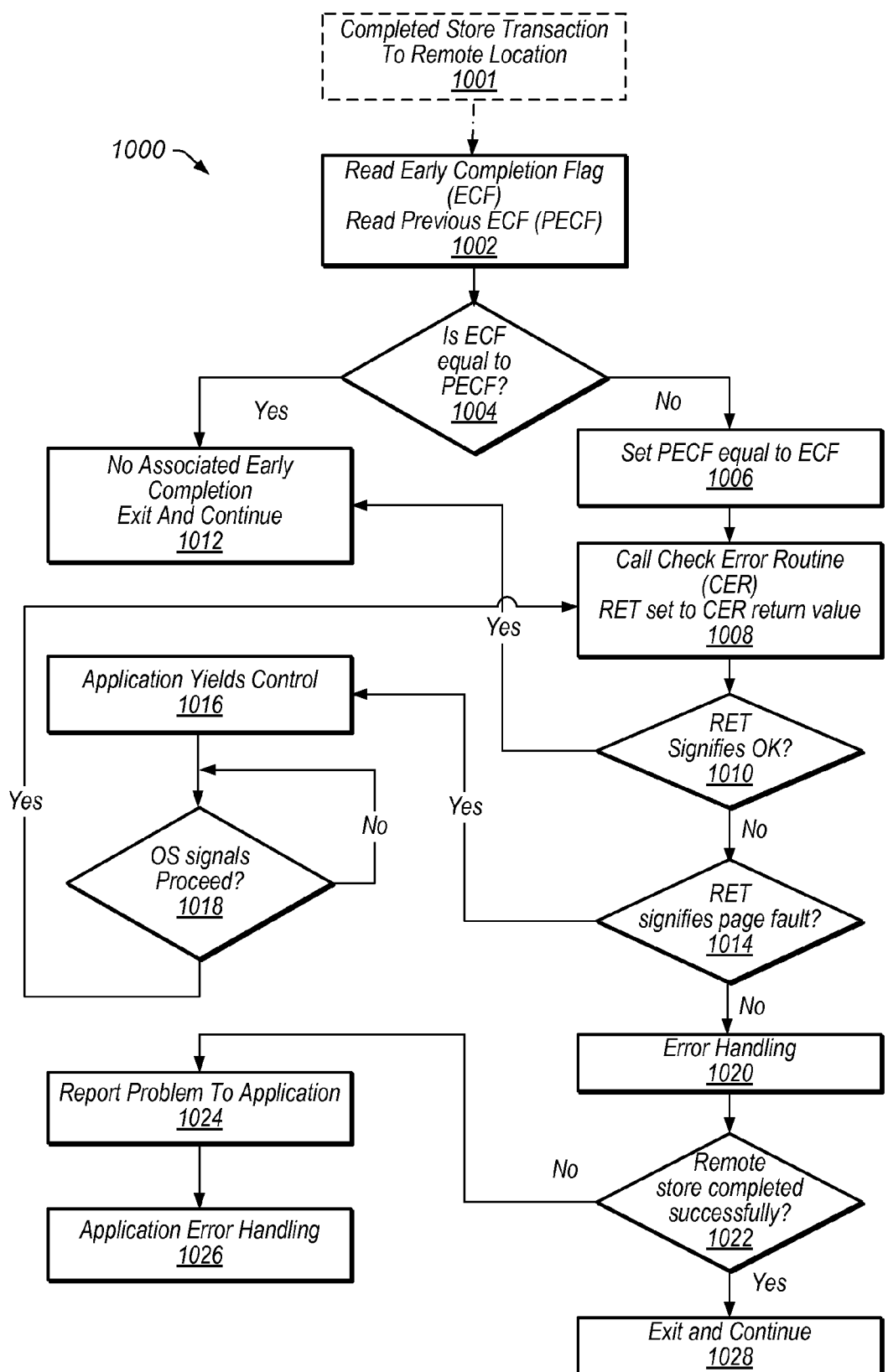
FIG. 10 illustrates an exemplary procedure used for checking completion status following the execution of a store instruction to a remote location.

Each load/store request to a remote location that could be terminated by EC is closely followed by a check routine that determines if the respective load/store transaction completed normally or if the transaction involved an early completion. This check routine is shown as 808 in FIG. 8. FIG. 9 shows an exemplary EC check routine that may be performed following a remote load transaction. FIG. 10 shows an exemplary EC check routine that may be performed following a remote store transaction.

As previously mentioned in the description of FIG. 8, an EC event involves the writing of a SN to the ECF, wherein the SN provides a link between the EC event and its respective load/store transaction. Additionally, the code performing the EC check may maintain a variable that is set to a last read ECF value. This variable may be called the previous ECF (or PECF). An EC checking routine may first determine if a "recent" EC has occurred by comparing the current value of the ECF with the value of the PECF. If these two values differ then the routine may rightly determine that an EC has occurred since the checking routine was last run within the current application. Such an occurrence may be deemed "recent" and, since the EC event may be due to the load/store transaction being checked, further steps may be taken to determine if this is the case. Alternatively, if the PECF and ECF match, then the checking routine may rightly determined that no EC event since the ECF was previously read and since this timescale (ECF read to ECF read) encompasses the load/store transaction that is being checked, the routine may also rightly determine that the load/store transaction did not have an early completion.

Completion Checking for Remote Load Transactions

FIG. 9 shows, in expanded detail, the exemplary EC check routine 808 for remote load transactions. The entry point to the check routine, 901, is the completion of a remote load transaction, as shown in FIG. 8. In 902, the routine obtains values for the (current) ECF and the PECF for the purposes of a comparison 904. If the PECF matches the ECF in 904, then it is determined that no EC event has occurred recently and consequently that the load transaction being checked did not have an early completion. The checking routine may exit and program flow may continue at 912.

The non-matching values of the PECF and the ECF indicate that there has been recent EC and so appropriate steps are taken. One of these steps is to set the PECF equal to the ECF at 906 so that the PECF is set up in readiness for future checks.

Since the recent EC may, in fact, be unrelated to the load transaction being checked, further assessment is performed. In 908, an operating system (OS) call is made to help determine if the recent EC may be attributed to the load transaction being checked. This OS call, here labeled Check Error Routine (CER), is submitted to the OS with arguments that include an address corresponding to the data location of the load transaction and that also include an identifier of the transaction type (i.e. load transaction). A result of this call is that a return value is provided to the calling routine, which is assigned in 908 to a variable (RET).

The value of the RET variable may then be queried to determine the appropriate next steps in the check routine. In 910, RET is compared to a value corresponding to a return code "OK". If RET matches "OK", it signifies that the recent EC was not associated with the load transaction being checked. In this case, flow proceeds to 912 and the checking routine may be exited and application flow can proceed normally.

If RET does not equal OK at 910, then the recent EC may be associated with the load transaction. The value of RET variable can be used to determine if there is a serious problem (in which case retrying the transaction is less likely to be successful) or if there is temporal issue (in which case a retry is more likely be successful). Temporal issues may be due to congestion issues, transient packet drops or page faults at a remote location.

In 914, the value of RET is checked to determine if a page fault is indicated. If so, flow continues to 916 where the software thread that issued the load request waits for the remote page fault to be handled. The software thread can wait in various ways, such as by going to sleep or otherwise yielding control to the operating system. When the operating system sends signal to proceed 918 (e.g. a wakeup signal), the remote load request is re-issued 920 and, when that load request completes, the EC check procedure will be entered again at 901.

In 924 error handling is performed. This may include waiting for the associated remote load transaction to complete. If the remote load transaction does eventually complete, the value of the load data may be written out as part of an ECR 720. The error handling routine 924, may involve iteratively waiting and searching the ECQ 710 for a corresponding ECR 720 that has valid data. Iteration may be required since the remote response delays are variable and the searched for ECR 720 may not be found in the ECQ 710 at first. If such as record is found, 924 may forward the load data to the associated software thread. If necessary, error handling 924 may also involve determining (e.g. by assessing the condition of the fabric) if a retry of the remote load request is likely to succeed. If, for example, the fabric is in acceptable condition and an associated retry count does not exceed a threshold, then the remote load request may be retried if deemed advantageous. When the retried remote load request completes, the EC check procedures will be entered again at 901.

If, after waiting (and perhaps repeated retries), load data has still not been obtained, a decision may be taken in 926 to report the problem to the associated application (or software thread). This situation could occur, for example, if there was a serious problem with either the network fabric or with the remote node being addressed. Under such circumstances, the application (or software thread) may be informed of the problem status 930. Based on the information provided, the application may perform application specific recovery actions or die gracefully 932. If, in 926, the load data is available, it may be provided to the application and the EC check routine may be exited and the application can continue 928.

Alternative Embodiments

As previously described, loads that complete early may return a certain "signature" data value. In an alternative embodiment, an application may first compare a remote load return value with the signature value and, if there is a match, execute the flow shown in FIG. 9. If the values do not match, then the load transaction did not have an EC. This approach to checking might be advantageous since the load value is already in a CPU register. Note that a remote load transaction that returns the signature value has not necessarily completed early since the signature value could be a valid return value in the application (although this is unlikely).

In another alternative embodiment, a single check of the ECF may be performed following a sequence of loads. This approach may reduce checking overhead when the ratio of early completions to normal completions is sufficiently low. However, when the ECF indicates a potential EC, correct processing may involve checking each load separately. Also, performing retry sequences may involve taking execution ordering requirements into account.

Completion Checking for Remote Store Transactions

An exemplary early completion checking routine for store transactions 1000 is shown in FIG. 10. In 1002, the routine obtains values for the (current) ECF and the PECF for the purposes of a comparison 1004. If the PECF matches the ECF, then it is deemed that no EC event has occurred recently and consequently that the store transaction being checked did not have an early completion. The checking routine may exit and program flow may continue 1012.

The non-matching values of the PECF and the ECF indicate that there has been recent EC and so appropriate steps are taken. One of these steps is to set the PECF equal to the ECF 1006 so that the PECF is set up in readiness for future checks.

Since the recent EC may, in fact, be unrelated to the store transaction being checked, further assessment is performed. In 1008, an operating system (OS) call is made to help determine if the recent EC may be attributed to the store transaction being checked. This OS call, here labeled Check Error Routine (CER), is submitted to the OS with arguments that include an address corresponding to the data location of the store transaction and that also include an identifier of the transaction type (i.e. store transaction). A result of this call is that a return value is provided to the calling routine, which is assigned in 1008 to a variable (RET).

The value of the RET variable may then be queried to determine the appropriate next steps in the check routine. In 1010, RET is compared to a value corresponding to a return code "OK". If RET matches OK, it signifies that the recent EC was not associated with the store transaction being checked. In this case flow proceeds to 1012 and the checking routine may be exited and application flow can proceed normally.

If RET does not equal OK, then the recent EC may be associated with the store transaction. The value of RET variable can be used to determine if there is a serious problem (in which case retrying the transaction is less likely to be successful) or if there is temporal issue (in which case a retry is more likely be successful).

In 1014, the value of RET is checked to determine if a page fault is indicated. If so, flow continues to 1016 where the software thread that issued the store request waits for the remote page fault to be handled. The software thread can wait in various ways, such as by going to sleep or otherwise yielding control to the operating system. When the operating system sends signal to proceed 1018 (e.g. a wakeup signal), flow returns to the EC check procedure 1008. Unlike the situation on FIG. 9, with remote load transactions, a network adapter may capable of retaining a remote store request and retrying it without the CPU reissuing the request. So in FIG. 10, the procedure checks for completion without a reissuing of the request.

In 1020 error handling is performed. This may include waiting for the associated remote store transaction to complete. If the remote store transaction does eventually complete, confirmation information may be written out in the form of a completion record ECR 720. The error handling routine 1020, may involve iteratively waiting and searching the ECQ 710 for a corresponding ECR 720 that has valid data. Iteration may be required since the remote response delays are variable and the searched for ECR 720 may not be found in the ECQ 710 at first.

If, after waiting, the remote store transaction has still not completed successfully, a decision may be taken, in 1022, to report the problem to the associated application (or software thread). This situation could occur, for example, if there was a serious problem with either the network fabric or with the remote node being addressed. Under such circumstances, the application (or software thread) may be informed of the problem status 1024. Based on the information provided, the application may perform application specific recovery actions or die gracefully 1026. If, in 1022, it can be determined that the remote store has completed successfully, the EC check routine may be exited and the application can continue 1028.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for transferring data over a network, the method comprising:
receiving a first local data transfer request over a local communications bus from a first compute node;
converting the first local data transfer request to a first remote data transfer request;
transmitting the first remote data transfer request to the network through a network connection;
monitoring the network connection for a first remote completion response corresponding to the first remote data transfer request; and
generating and transmitting over the local communications bus to the first compute node a first local completion response corresponding to the first local data transfer request, wherein said generating and transmitting is performed in response to not receiving the first remote completion response within a specific time period from said transmitting the first remote data transfer request;
wherein the first local completion response indicates that the first local data transfer request has been completed.

2. The method of claim 1, further comprising:
receiving the first remote completion response after the specific time period;
generating and transmitting, over the local communications bus, first response information corresponding to the first remote completion response, in response to receiving the first remote completion response after the specific time period.

3. The method of claim 2,
wherein the first response information is configured to replace at least a portion of data transmitted during said transmitting the first local completion response.

4. The method of claim 1, wherein said converting comprises:
comparing a portion of an address field of a first local transfer request to one or more specified values;
selecting a set of data items based on said comparing; and
generating the first remote data transfer request based on one or more of the set of data items.

5. The method of claim 4, wherein said selecting the set of data items comprises performing one or more of:
selecting at least one data item indicating the validity of corresponding data items in the set of data items;
selecting at least one data item representing an Infiniband queue pair;
selecting at least one data item representing a portion of a remote address;
selecting at least one data item used to validate an RDMA (Remote Direct Memory Access) operation on a remote node;
selecting at least one data item indicating whether data can be stored at a corresponding remote address; or
selecting at least one data item indicating the virtual memory page size at a corresponding remote address.

6. The method of claim 1, further comprising:
in response to not receiving the first remote completion response within the specific time period:
generating a first record comprising first information corresponding to the first local completion response; and
updating a first memory location with second information identifying the first local completion response.

7. The method of claim 6, wherein the first information comprises one or more of:
the second information;
third information identifying whether the first local data transfer request was a load request or a store request; or
address information corresponding to the first local data transfer request.

8. The method of claim 7, further comprising:
reading the first memory location to obtain current information stored in the first memory location;
comparing the current information to previously read information from the first memory location;
determining that the current information is not the same as the previously read information;
in response to said determining that the current information is not the same as the previously read information;
determining that a first set of records comprises the first record; and
in response to determining that the first set of records comprises the first record, confirming that the remote completion response was not received within the specific time period.

9. The method of claim 8,
wherein said determining that the first set of records does comprise the first record is performed based on the second information and the address information.

10. The method of claim 1,
wherein the method is performed by a compute node interface device, wherein the compute node interface device is coupled to the first compute node.

11. The method of claim 1, further comprising:
receiving a second local data transfer request over the local communications bus from a first compute node;
converting the second local data transfer request to a second remote data transfer request;
transmitting the second remote data transfer request to the network through the network connection;
monitoring the network connection for a second remote completion response corresponding to the second remote data transfer request; and
generating and transmitting over the local communications bus to the first compute node a second local completion response based on the second remote completion response and corresponding to the second local data transfer request, in response to receiving the second remote completion response within the specific time period;

wherein the second local completion response indicates that the second local data transfer request has been completed.

12. The method of claim 1, further comprising:
receiving a third local data transfer request over the local communications bus from a first compute node;
converting the third local data transfer request to a third remote data transfer request;
transmitting the third remote data transfer request to the network through the network connection;
monitoring the network connection for a remote error response corresponding to the remote data transfer request, wherein the remote error response indicates that the remote data transfer has been terminated unsuccessfully;
generating a third local completion response in response to receiving the remote error response;
wherein the third local completion response indicates that the third local data transfer request has been completed.

13. A method for transferring data over a network, the method comprising;
receiving a first local load data transfer request over a local communications bus;
converting the first local load data transfer request to a first remote data transfer request;
transmitting the first remote data transfer request to the network over a network connection;
monitoring the network connection for a first remote completion response corresponding to the first remote data transfer request; and
in response to not receiving the first remote completion response within the specified time period, generating and transmitting over the local communications bus, a first local completion response corresponding to the first local data transfer request, wherein said transmitting the first local completion response comprises:
transmitting acknowledgment data indicative of the first local data transfer having completed; and
transmitting first local load data; wherein the first local load data comprises first data of a pre-determined value.

14. The method of claim 13 further comprising:
receiving a second local load data transfer request over a local communications bus;
converting the second local load data transfer request to a second remote data transfer request;
transmitting the second remote data transfer request to the network over a network connection;
monitoring the network connection for a second remote completion response corresponding to the second remote data transfer request; and
in response to receiving the second remote completion response within the specified time period, generating and transmitting over the local communications bus, a second local completion response corresponding to the second local data transfer request, wherein said transmitting the second local completion response comprises:
transmitting acknowledgment data indicative of the second local data transfer having successfully completed; and
transmitting second local load data, wherein the second local load data comprises second data received over the network connection as part of the remote completion response.

15. The method of claim 14, further comprising:
receiving the second local load data;
determining that the received second local load data does not comprise the predetermined value; and
in response to said determining that the received second local load data does not comprise the predetermined value, confirming that the second load data comprises the second data.

16. The method of claim 14, further comprising:
receiving the second local load data;
determining that the received second local load data comprises the predetermined value;
in response to said determining that the received second load data comprises the predetermined value:
reading a first memory location to obtain current data stored in the first memory location;
determining that the current data has the same value as a previously read data from the first memory location; and
in response to said determining that the current data has the same value as the previously read data value, confirming that the second load data comprises the second data.

17. The method of claim 13,
wherein the method is performed by a compute node interface device, wherein the compute node interface device is coupled to a first compute node;
wherein the first local data transfer request is received from the first compute node.

18. A compute node interface device comprising:
a host interface configured to communicate with a local compute node during operation;
a network interface configured to communicate with a network during operation;
transfer management circuitry coupled to the host interface and the network interface, wherein during operation the transfer management circuitry:
receives a local data transfer request from the host interface;
converts the local data transfer request to a corresponding remote data transfer request;
transmits the corresponding remote data transfer request to the network through the network interface;
monitors the network connection for a remote completion response corresponding to the remote data transfer request;
generates and transmits, over the host interface, a first local completion response corresponding to the local data transfer request and based on the corresponding remote completion response, when the corresponding remote completion response is received by the transfer management circuitry within the specific time period;
generates and transmits, over the host interface, a second local completion response corresponding to the local data transfer request, when the corresponding remote completion response is not received by the transfer management circuitry within a specific time period from when the remote data transfer request was transmitted; and
wherein the first local completion response and the second local completion response each indicate that the local data transfer request has been completed.

19. The compute node interface device of claim 18, further comprising:
a memory which stores a tracking structure comprising one or more records, wherein each record comprises one or more of:
a first entry indicating a source of a respective local data transfer request of the local data transfer requests;
a second entry identifying the respective local data transfer request; or
a third entry indicating that a specific duration has elapsed, as measured from the transmission of the remote data transfer request corresponding to the respective local data transfer request.

20. The compute node interface device of claim 18, wherein the compute node interface device is configured to interface the local host system to a plurality of other host systems in a cluster computing system.

* * * * *